United States Statutory Invention Registration [19]

[11] Reg. Number: H523

Braun [43] Published: Sep. 6, 1988

[54] INHIBITORS FOR CONE-FREE END-BURNING OF DOUBLE BASE PROPELLANT GRAINS

[75] Inventor: John D. Braun, Ridgecrest, Calif.

[73] Assignee: The United States of America as represented by the Secretary of the Navy, Washington, D.C.

[21] Appl. No.: 87,851

[22] Filed: Aug. 20, 1987

[51] Int. Cl.[4] ..... C01B 15/00

[52] U.S. Cl. ..... 427/412.1; 102/290; 102/291; 523/180

[56] References Cited

U.S. PATENT DOCUMENTS

| | | | |
|---|---|---|---|
| 3,433,158 | 3/1969 | Pierce | 102/103 |
| 3,815,506 | 6/1984 | Tamulevich | 102/103 |
| 3,985,592 | 10/1976 | Hackett | 149/4 |

*Primary Examiner*—John F. Terapane
*Assistant Examiner*—Eric Jorgensen
*Attorney, Agent, or Firm*—William C. Townsend; W. Thom Skeer

[57] ABSTRACT

A double base propellant grain inhibitor is comprised of a hydroxyl-terminated polybutadiene polymer having from 2 to about 3 hydroxyl groups per average molecule and an approximate molecular weight of 2800 to 3600, an inert filler, a cross-linking agent, a thickening agent, an antioxidant, a curative, and a catalyst. When properly applied to the surface of a propellant grain, the inhibitor bond does not weaken with age and the inhibitor produces planar, no-cone grain burning having a constant chamber pressure during the burning of the propellant grain. A 1,4-butylene oxide-type polyether barrier layer consisting of a poly-1,4-butylene oxide diisocyanate with an approximate molecular weight of 850 to 1000, a diol curative, a triol cross-linker, and antioxidant and a cure catalyst can be added between the propellant grain and inhibitor to reduce propellant plasticizer migration.

9 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

INHIBITORS FOR CONE-FREE END-BURNING OF DOUBLE BASE PROPELLANT GRAINS

BACKGROUND OF THE INVENTION

1. Field of the Invention

The invention relates to solid propellants and more particularly to inhibitor compositions for limiting the exposed burning surface of solid propellant grains.

2. Description of the Prior Art

Inhibitors are used in solid propellants grains to limit the exposed burning surface. Inhibitor compositions resist combustion and are applied as a thin layer to the surface where burning is to be initially prevented. By restricting the grain burning surface area, relatively constant propellant thrust or gas volume can be maintained during motor firing. This is particularly important in cartridge actuated devices and in gas generators which must supply a steady stream of gas for long periods.

Various polymeric materials and resin-base compositions have been used as inhibitors. Some previously used polymer inhibitors require a volatile solvent for application to the grain. Evaporation of the solvent during curing can produce voids in the inhibitor. Such voids at the inhibitor/grain interface during burning can produce erratic rocket motor performance or even explosions.

Double-base propellants are usually inhibited with a cellulose based plastic such as ethyl cellulose. Ethyl cellulose based plastics are applied conventionally in the form of several layers of an inhibitor wrap or tape using an appropriate solvent system such as ethyl lactate/butyl acetate (50/50) to bond the inhibitor to the propellant grain.

Ethyl cellulose type inhibitors work well enough with an internal burning propellant grain. However, in an end-burning grain, such inhibitors permit minute propellant side-burning at the propellant/inhibitor/-flame juncture. This side-burning produces an increasing burning surface area described as coning during motor firing which causes increasing chamber pressures in the rocket motor, as well as higher mass flow and correspondingly higher thrust. Such changes of pressure, mass flow, and thrust can be intolerable for systems requiring precise rocket ballistic behavior for proper operation.

SUMMARY OF THE INVENTION

A double base propellant grain inhibitor is comprised of a hydroxyl-terminated polybutadiene polymer having between 2 to about 3 hydroxyl groups per average molecule and an approximate molecular weight of 2800 3600, a cross-linking agent, an inert filler, a thickening agent, an antioxidant, a curative, and a catalyst. When properly applied to the surface of a propellant grain, the inhibitor causes planar, no-cone grain burning and constant chamber pressure during the burning of the propellant grain. A polyether barrier layer consisting of poly-1,4-butylene oxide diisocyanate with an approximate molecular weight of 850 to 1000, a diol curative, a triol cross-linker, an antioxidant, and a cure catalyst can be added between the propellant grain and inhibitor to reduce propellant plasticizer migration.

It is an object of this invention to provide an inhibitor composition for solid propellant grains.

Another object of this invention is to provide a method of inhibiting an end-burning double-base propellant grain without the use of a solvent in the inhibitor.

Another object of this invention is to provide an inhibitor system having a barrier layer to prevent migration of plasticizer.

Still another object of this invention is a method of inhibiting a solid propellant grain providing a strong propellent/inhibitor bond that does not weaken with age.

DETAILED DESCRIPTION OF THE INVENTION

According to the present invention, an inhibitor for double-base end-burning propellant grains comprises a hydroxyl-terminated polybutadiene polymer having from 2 to about 3 hydroxy groups per average molecule and an approximate molecular weight of 2800 to 3600, an inert filler, a thickening agent, an antioxidant, a curative, and a catalyst.

The hydroxyl-terminated polybutadiene component of the inhibitor composition is present in about 65% by weight. The hydroxyl-terminated polybutadiene polymer having the trade designation R-45M is used in the present invention. The polymer R-45M is sold by the Arco Chemical Company and its structure may be represented as:

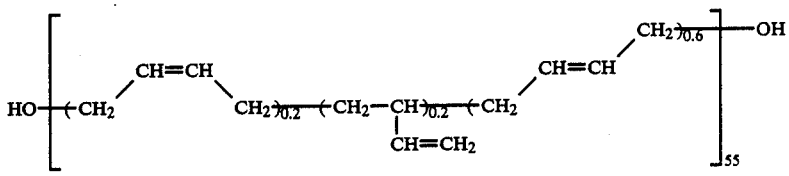

The inert filler component of the inhibitor composition is a finely divided heat-resistant agent. Titanium dioxide and fumed silica are preferred although other fillers such as refractory oxides may be used. About 2% by weight fumed silica is used, serving as both inert filler and thickening agent, together with about 22% by weight titanium dioxide. The inert filler thus represents about 24% by weight of the inhibitor composition. The amounts of these components in the composition may be varied depending on the degree of heat resistance and thickening desired. A higher degree of heat resistance is obtained with greater amounts.

Triethanolamine is added as a cross-linking agent in the amount of about 1.8% by weight. Other triol cross-linkers may also be suitable. The amount of cross-linking agent can be varied to alter the degree of toughness of the inhibitor as required.

In one embodiment of the invention, the inhibitor is made up as a premix containing all ingredients but the curative and catalyst, and having an indefinite shelf life. Catalyst and a curative are added to the premix just before use.

In order to provide chemical aging stability to the inhibitor, an antioxidant is used. 2,2'-methylenebis-(4-methyl-6-tertiarybutyl phenol) is a preferred antioxidant although others may be used. The antioxidant component is about 0.6% by weight of the inhibitor composition.

An organic diisocyanate is used as the composition curative and is added in a proportion of about 8% by weight. Although toluene diisocyanate is preferred, other organic diisocyanates may be used. The amount of this component may be varied to obtain the required NCO/OH equivalent ratio of 1.00 to 1.02 (excluding the OH present in the antioxidant). Dibutyltin dilaurate catalyst is used to accelerate curing of the composition and is present in the proportion of about 0.04% by weight. Using different diisocyanate curatives or different amounts of curative may require changes in the amount of dibutyltin dilaurate catalyst used.

An adhesion promoter comprising a solution of the biuret trimer of hexamethylene diisocyanate in methylene chloride is applied to the surface of the grain before the inhibitor. The biuret trimer of hexamethylene diisocyanate has the trade designation Desmodur N-100 and is sold by the Mobay Chemical Company. An adhesion promotor is essential for strong, permanent bonding of the inhibitor to the propellant grain. Without the adhesion promoter, the inhibitor bonds well initially but gradually loses bond strength after about 2 or 3 weeks. The propellant/inhibitor bond deterioration is attributed to the effects of propellant plasticizer migration.

In one embodiment of the invention, a barrier layer is applied after the adhesion promoter and before the inhibitor. The barrier layer of the invention comprises the diisocyanate terminated 1,4-butylene oxide-type polyether poly-1,4-butylene oxide diisocyanate with an approximate molecular weight of 850 to 1000. Adiprene L315 by DuPont Chemical company is used in the present invention. The barrier layer also contains a 1,4-butanediol curative, a trimethylolpropane cross-linker, 2,2'-methylenebis-(4-methyl-6-tertiarybutyl phenol) antioxidant, and dibutyltin dilaurate catalyst. The NCO-/OH equivalent ratio of the mixture (excluding the antioxidant) is held at 1.00 to 1.02. The ingredients should be mixed carefully to avoid stirring in air bubbles. Likewise, the ingredients should be dried and degassed before use to avoid bubble formation in the resulting barrier layer. This layer retards migration of plasticizer from the propellant grain into the inhibitor.

The following examples are provided to illustrate but not limit the invention:

EXAMPLE 1

Inhibitor Premix

The inhibitor is first made up in the form of a premix compounded in the following proportions expressed in percent by weight:

71.2% hydroxyl-terminated polybutadiene (equivalent weight 1206 grams, molecular weight approximately 2800 grams),
2.0% triethanolamine,
24.0% titanium dioxide,
2.2% fumed silica, and
0.6% 2,2'-methylenebis-(4-methyl-6-tertiarybutyl-phenol) antioxidant.

The hydroxyl-terminated polybutadiene, triethanolamine, and antioxidant are blended. The fumed silica and titanium dioxide is then added as the mixture is stirred by a high speed, high shear mixer. The fully stirred material is then degassed in a vacuum bell at a pressure of 5 torr and poured into paint cans. The cans are purged with nitrogen and sealed. Stored at room temperature, the premix has an indefinite shelf-life.

Application of the Inhibitor

To use the inhibitor, a curative and catalyst is added to the premix in the following proportions expressed in percent by weight:

92.0% premix,
8.0% toluene diisocyanate curative, and
0.04% dibutyltin dilaurate catalyst, with an overall NCO/OH equivalent ratio of 1.00 to 1.02 (antioxidant excluded).

The ingredients are mixed well before application. To apply the inhibitor composition to a propellant grain, the grain is first mounted on a lathe or similar devide that allows the grain to turn smoothly between centers. An adhesion promoter, comprising a 10% by weight solution of the biuret trimer of hexamethylene diisocyanate in methylene chloride solvent, is applied to wet surface of the grain and then allowed to dry for at least 30 minutes. The inhibitor is applied while turning the propellant grain on the lathe, while using a "doctor blade" attachment to smooth the inhibitor to the proper thickness. When the first coat has gelled (approximately 2 hours at 77° F.), a second coat is applied for a total thickness of 0.090 inch. When the second coat is well gelled (tacky but not sticky), the grain is removed from the lathe and stood upright on its uninhibited bottom or nozzle end. The head or upper end of the grain is then inhibited using the adhesion promoter solution and one coat of inhibitor, applied with a spatula. The grain is allowed to cure for 3 to 4 days at 77° F. More rapid curing can be obtained by mild heating.

A 4.6 inch diameter end-burning double-base propellant grain containing nitrocellulose, nitroglycerine, diethyl phthalate, lead salicylate, and lead 2-ethylhexoate was inhibited using the inhibitor composition and method of this example. Upon firing in a 5 inch rocket motor, the inhibited grain produced a flat or neutral chamber pressure versus time trace. A flat trace was also produced with inhibited grains after aging 2 months.

EXAMPLE 2

Barrier Layer

The inhibitor of this example is the same as Example 1 except that it includes a barrier layer to retard migration of plasticizer into the inhibitor. The adhesion promoter and inhibitor are applied as described previously except that the barrier layer is applied to the propellant grain after the adhesion promoter and before the inhibitor.

The barrier layer is formulated in the following proportions expressed in percent by weight:

90.8% diisocyanate-terminated polyether (poly-1,4-butylene oxide diisocyanate, equivalent weight 446 grams),
4.6% 1,4-butanediol curative,
4.5% trimethylolpropane cross-linker,
0.1% 2,2'-methylenebis-(4-methyl-6-tertiarybutyl-phenol) antioxidant, and
0.02% dibutyltin dilaurate catalyst, with an NCO/OH equivalent ratio of 1.00 to 1.02 (antioxidant excluded).

The barrier layer is applied to the adhesion promoter coated propellant grain in the same manner as the inhibitor in Example 1. The barrier layer is applied to a thickness of about 0.020 to about 0.045 inch. After allowing the barrier layer to gel (approximately 3 hours at 77° F.), the inhibitor is applied and allowed to cure so that the total thickness of the barrier layer and the inhibitor is about 0.090 inch.

This inhibitor/barrier system also produce a flat or neutral chamber-pressure-versus-time trace with an end-burning double-base propellant grain containing nitrocellulose, nitroglycerine, diethyl phthalate, lead salicylate, and lead 2-ethylhexoate. The effectiveness of the barrier layer for stopping plasticizer migration is shown by the degree of migration of a yellow-orange stabilizer present in the propellant. Small amounts of this stabilizer (2-nitrodiphenylamine or 2-NDPA) are carried out of the propellant during plasticizer migration, imparting a yellow color to any substrate that absorbs the migrating plasticizer. Inhibitors such as ethyl cellulose or silicone rubber can become very yellow after as little as several days at room temperature. The inhibitor of the present invention without the barrier layer only turns a pale cream-yellow in the same period of time. With the barrier layer, the inhibitor and barrier layers have only a slight color change after aging several months.

Modifications and variations of the present invention are possible. It should be understood that, within the scope of the appended claims, the invention may be practiced otherwise than as specifically described.

What is claimed is:

1. A double-base end-burning propellant grain inhibitor comprising:

a hydroxyl-terminated polybutadiene polymer having from 2 to about 3 hydroxyl groups per average molecule, and a molecular weight of approximately 2800 to 3600;

a triol cross-linker;

an inert filler;

a thickening agent;

an antioxidant;

a curative; and a catalyst, so that said double base propellant grain inhibitor, when applied to the surface of a double base propellant grain, wiill produce planar, no-cone grain burning with constant chamber pressure during the burning of said propellant grain.

2. The propellant grain inhibitor of claim 1 wherein said inert filler comprises about 2 percent by weight fumed silica thickening agent and about 22 percent by weight titanium dioxide, said cross-linking agent is triethanolamine, said antioxidant is 2,2'-methylenebis-(4-methyl-6-tertiarybutyl phenol), said curative is toluenediisocyanate, and said catalyst is dibutyltin dilaurate.

3. A double-base end-burning propellant grain inhibitor comprising:

about 65.5 percent by weight of a hydroxyl-terminated polybutadiene polymer having from 2 to about 3 hydroxyl groups per average molecular, and an approximate molecular weight of 2800 to 3600;

about 24 percent by weight of an inert filler, said inert filler comprising about 2 percent by weight fumed silica and about 22 percent by weight titanium dioxide;

about 1.8 percent by weight of triethanolamine cross-linking agent;

about 0.6 percent by weight of 2,2'-methylenebis-(4-methyl-6-tertiarybutyl phenol) antioxidant;

about 8.0 percent by weight of toluenediisocyanate curative; and about 0.04 percent by weight of dibutyltin dilaurate catalyst.

4. A method of inhibiting an end-burning double-base propellant grain comprising the steps of:

applying an adhesion promoter to a propellant grain, said adhesive promoter being a 10 percent by weight solution of the biuret trimer of hexamethylene diisocyanate in methylene chloride solvent;

mixing an inhibitor premix with curative and a catalyst to form a propellant grain inhibitor; and applying said propellant grain inhibitor to said propellant grain for a total thickness of inhibitor sufficient to produce a planar, no-coning grain burning having a constant chamber pressure during the burning of said propellant grain.

5. The method of claim 4 wherein a barrier layer is applied to said propellant grain after said adhesion promoter is applied and before said propellant grain inhibitor is applied.

6. The method of claim 5 wherein said barrier layer comprises:

about 90.8 percent by weight of a diisocyanate-terminated 1,4-butylene oxide-type polyether;

about 4.6 percent by weight of 1,4-butanediol curative;

about 4.5 percent by weight of trimethylolpropane cross-linker;

about 0.1 percent by weight of 2,2'-methylenebis-(4-methyl-6-tertiarybutyl phenol) antioxidant; and about 0.02 percent by weight of dibutyltin dilaurate catalyst, so that the NCO/OH equivalent ratio is from 1.00 to 1.02, excluding the antioxidant.

7. The method of claim 6 wherein said diisocyanate-terminated polymer is poly-1,4-butylene oxide diisocyanate with a molecular weight of approximately 850 to 1000.

8. The method of claim 4 wherein said inhibitor premix comprises:

about 71 percent by weight of a hydroxyl-terminated polybutadiene polymer having from 2 to about 3 hydroxyl groups per average molecular, and a molecular weight of approximately 2800 to 3600;

about 26 percent by weight of an inert filler, said inert filler comprising about 2 percent by weight fumed silica and about 22 percent by weight titanium dioxide;

about 2 percent by weight of triethanolamine cross-linking agent; and about 0.6 percent by weight of 2,2'-methylenebis-(4-methyl-6-tertiarybutyl phenol) antioxidant.

9. The method of claim 4 wherein said propellant grain inhibitor comprises:

about 92 percent by weight inhibitor premix;

about 8.0 percent by weight of toluene diisocyanate curative; and about 0.04 percent by weight of dibutyltin dilaurate catalyst, so that the NCO/OH equivalent ratio is from 1.00 to 1.02, excluding the antioxidant.

* * * * *